US012580392B2

(12) United States Patent
Huhn et al.

(10) Patent No.: US 12,580,392 B2
(45) Date of Patent: Mar. 17, 2026

(54) SYSTEM, APPARATUS, AND METHOD FOR MACHINE-TO-MACHINE CHARGING AT A WORKSITE

(71) Applicant: Caterpillar Paving Products Inc., Brooklyn Park, MN (US)

(72) Inventors: Derek K. Huhn, Monticello, MN (US); Robert K. Iverson, Maple Grove, MN (US); Anwar T. Alnatsheh, Maple Grove, MN (US); Kenneth G. Jones, Princeton, MN (US); John L Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 1158 days.

(21) Appl. No.: 17/526,002

(22) Filed: Nov. 15, 2021

(65) Prior Publication Data

US 2023/0155423 A1 May 18, 2023

(51) Int. Cl.
| | |
|---|---|
| *H02J 7/34* | (2006.01) |
| *B60L 53/66* | (2019.01) |
| *B60L 53/68* | (2019.01) |
| *B60L 55/00* | (2019.01) |
| *B60L 58/12* | (2019.01) |
| *B60L 50/60* | (2019.01) |
| *B60L 53/14* | (2019.01) |
| *B60L 58/13* | (2019.01) |

(Continued)

(52) U.S. Cl.
CPC .............. *H02J 7/342* (2020.01); *B60L 58/12* (2019.02); *B60L 50/60* (2019.02); *B60L 53/14* (2019.02); *B60L 53/66* (2019.02); *B60L 53/68*

(2019.02); *B60L 55/00* (2019.02); *B60L 58/13* (2019.02); *B60L 2200/40* (2013.01); *B60L 2260/52* (2013.01); *B60L 2260/54* (2013.01); *H02J 7/00032* (2020.01); *H02J 7/0048* (2020.01); *H02J 50/10* (2016.02); *H02J 50/80* (2016.02); *H02J 2310/48* (2020.01); *H04B 5/22* (2024.01); *H04B 5/24* (2024.01); *H04B 5/79* (2024.01); *Y02T 90/16* (2013.01)

(58) Field of Classification Search
CPC ................................. H02J 7/342; B60L 58/12
USPC ......................................... 320/103, 104, 134
See application file for complete search history.

(56) References Cited

U.S. PATENT DOCUMENTS

| | | | |
|---|---|---|---|
| 8,120,310 B2 * | 2/2012 | Littrell | H02J 7/35 320/109 |
| 8,378,627 B2 * | 2/2013 | Asada | B60L 53/305 320/109 |

(Continued)

FOREIGN PATENT DOCUMENTS

| | | | |
|---|---|---|---|
| CN | 111002847 A | | 4/2020 |
| JP | 2013129976 A | * | 7/2013 |

(Continued)

*Primary Examiner* — John T Trischler

(57) ABSTRACT

A system, apparatus, and method may operatively couple machines, each powered, at least in part by an energy accumulator, together to charge one machine using power of another machine. On condition that a first remaining amount of power in a first machine is less a first total amount of power needed to complete a first task and charging of the first machine takes priority over completion of a second task to be completed by a second machine, the second machine can travel to the first machine and charge a first energy accumulator in the first machine.

17 Claims, 3 Drawing Sheets

(51) Int. Cl.

| | |
|---|---|
| *H02J 7/00* | (2006.01) |
| *H02J 50/10* | (2016.01) |
| *H02J 50/80* | (2016.01) |
| *H04B 5/22* | (2024.01) |
| *H04B 5/24* | (2024.01) |
| *H04B 5/79* | (2024.01) |

(56) References Cited

U.S. PATENT DOCUMENTS

| | | | | |
|---|---|---|---|---|
| 8,504,227 | B2 * | 8/2013 | Ichishi | B60L 1/003 |
| | | | | 701/29.3 |
| 8,509,976 | B2 * | 8/2013 | Kempton | B60L 53/305 |
| | | | | 320/109 |
| 8,700,246 | B2 * | 4/2014 | Kurikuma | E02F 9/2246 |
| | | | | 701/50 |
| 8,860,362 | B2 * | 10/2014 | Kamen | B60L 53/00 |
| | | | | 320/109 |
| 8,878,393 | B2 | 11/2014 | Kirby et al. | |
| 8,890,473 | B2 * | 11/2014 | Muller | B60L 53/16 |
| | | | | 700/297 |
| 8,983,657 | B2 * | 3/2015 | Jacobson | B60L 53/80 |
| | | | | 701/1 |
| 9,043,038 | B2 * | 5/2015 | Kempton | B60L 53/665 |
| | | | | 320/109 |
| 9,126,493 | B2 * | 9/2015 | Suganuma | B60L 53/30 |
| 9,321,361 | B2 * | 4/2016 | Kamen | B60L 8/003 |
| 9,379,559 | B2 * | 6/2016 | O'Connell | G01C 21/3469 |
| 9,722,442 | B2 * | 8/2017 | Berry | E21F 17/06 |
| 9,731,614 | B1 | 8/2017 | Sarwat et al. | |
| 9,744,870 | B2 * | 8/2017 | Cronie | H02J 50/90 |
| 9,754,300 | B2 * | 9/2017 | Kempton | B60L 53/665 |
| 10,011,181 | B2 * | 7/2018 | Dudar | H04B 5/79 |
| 10,220,717 | B2 * | 3/2019 | Ricci | B60L 53/12 |
| 10,245,968 | B2 * | 4/2019 | O'Connell | B60L 53/63 |
| 10,336,205 | B2 * | 7/2019 | O'Connell | G06Q 40/04 |
| 10,377,260 | B2 * | 8/2019 | Donnelly | G05D 1/0088 |
| 10,468,897 | B2 * | 11/2019 | Fan | B60L 53/32 |
| 10,507,733 | B2 * | 12/2019 | Blum | B60L 53/30 |
| 10,525,833 | B2 * | 1/2020 | Rozman | B60L 55/00 |
| 10,532,663 | B2 * | 1/2020 | Ricci | B60L 53/126 |
| 10,581,260 | B2 * | 3/2020 | Fan | B60L 15/42 |
| 10,710,467 | B2 * | 7/2020 | Sawada | H02J 7/342 |
| 10,836,273 | B2 * | 11/2020 | Zhu | B60L 53/20 |
| 10,836,275 | B2 * | 11/2020 | Zhu | B60L 53/62 |
| 10,870,364 | B2 * | 12/2020 | Mere | B60L 53/38 |
| 10,933,767 | B2 | 3/2021 | Javaid | |
| 11,001,161 | B2 * | 5/2021 | Rosene | B60L 50/50 |
| 11,051,145 | B2 * | 6/2021 | Mizutani | G05D 1/0088 |
| 11,124,080 | B2 * | 9/2021 | Donnelly | G06Q 30/0283 |
| 11,148,542 | B2 * | 10/2021 | Donnelly | B60L 53/665 |
| 11,177,700 | B2 * | 11/2021 | Fan | B60L 53/32 |
| 11,207,995 | B2 * | 12/2021 | Marsolek | B60L 53/66 |
| 11,235,675 | B2 * | 2/2022 | Choi | H04W 4/46 |
| 11,264,825 | B1 * | 3/2022 | Harris | B60L 53/305 |
| 11,273,727 | B2 * | 3/2022 | Mortensen | B60L 53/16 |
| 11,364,809 | B2 * | 6/2022 | Biagini | H02J 7/342 |
| 11,376,979 | B2 * | 7/2022 | Chakraborty | B60L 53/36 |
| 11,383,611 | B2 * | 7/2022 | Hishida | H02J 7/00034 |
| 11,390,180 | B2 * | 7/2022 | Kim | B60L 53/35 |
| 11,413,982 | B2 * | 8/2022 | Goei | B60L 53/68 |
| 11,535,115 | B2 * | 12/2022 | Takebayashi | B60L 53/36 |
| 11,623,637 | B2 * | 4/2023 | Salter | B60L 53/37 |
| | | | | 340/932.2 |
| 11,631,982 | B2 * | 4/2023 | Robinson | B60L 53/57 |
| | | | | 320/107 |
| 11,635,771 | B2 * | 4/2023 | Cheung | G06Q 50/40 |
| | | | | 701/23 |
| 11,660,972 | B2 * | 5/2023 | Kamen | B60L 53/65 |
| | | | | 320/104 |
| 11,663,561 | B2 * | 5/2023 | Starns | B60L 53/36 |
| | | | | 701/2 |
| 11,685,283 | B2 * | 6/2023 | Lu | B60L 53/65 |
| | | | | 320/109 |

| | | | | |
|---|---|---|---|---|
| 11,691,526 | B2 * | 7/2023 | Oetken | B60L 53/30 |
| | | | | 320/109 |
| 11,731,524 | B2 * | 8/2023 | Martin | G01R 31/382 |
| | | | | 320/109 |
| 11,733,056 | B2 * | 8/2023 | Thum | G01C 21/3664 |
| | | | | 320/109 |
| 11,820,246 | B2 * | 11/2023 | Donnelly | H02J 50/10 |
| 11,858,369 | B2 * | 1/2024 | Books | B60L 53/53 |
| 11,878,595 | B2 * | 1/2024 | Masoud | H02J 50/05 |
| 11,890,957 | B2 * | 2/2024 | Chakraborty | G07F 15/005 |
| 11,898,856 | B2 * | 2/2024 | Gerrese | G01C 21/3438 |
| 11,939,745 | B2 * | 3/2024 | Ishii | E02F 9/2004 |
| 11,964,581 | B2 * | 4/2024 | Frelich | B60L 58/12 |
| 11,964,583 | B2 * | 4/2024 | Salter | B60L 53/14 |
| 11,987,146 | B2 * | 5/2024 | Tsuchiya | H02J 3/322 |
| 12,024,041 | B2 * | 7/2024 | Nakagawa | G01C 21/3407 |
| 12,049,151 | B2 * | 7/2024 | Wang | B60L 53/53 |
| 12,065,791 | B2 * | 8/2024 | Romero | E01C 19/282 |
| 12,105,525 | B2 * | 10/2024 | Chen | B60L 50/13 |
| 12,128,790 | B2 * | 10/2024 | Marsolek | B60L 1/08 |
| 12,151,582 | B2 * | 11/2024 | Goei | B60L 53/67 |
| 12,191,699 | B2 * | 1/2025 | Salter | B60L 53/68 |
| 2010/0141201 | A1 * | 6/2010 | Littrell | H02S 40/32 |
| | | | | 320/101 |
| 2010/0201189 | A1 * | 8/2010 | Kirby | H02J 50/80 |
| | | | | 307/104 |
| 2010/0217485 | A1 * | 8/2010 | Ichishi | H01M 10/441 |
| | | | | 701/36 |
| 2011/0025267 | A1 * | 2/2011 | Kamen | B60L 53/665 |
| | | | | 320/109 |
| 2011/0031929 | A1 * | 2/2011 | Asada | H02J 7/0013 |
| | | | | 320/109 |
| 2011/0144823 | A1 * | 6/2011 | Muller | B60L 53/305 |
| | | | | 700/297 |
| 2011/0202192 | A1 * | 8/2011 | Kempton | H02J 3/008 |
| | | | | 320/109 |
| 2011/0202217 | A1 * | 8/2011 | Kempton | G06Q 30/0601 |
| | | | | 320/109 |
| 2011/0202418 | A1 * | 8/2011 | Kempton | B60L 53/63 |
| | | | | 705/26.1 |
| 2012/0019057 | A9 * | 1/2012 | Kirby | H02J 50/80 |
| | | | | 307/104 |
| 2012/0306446 | A1 * | 12/2012 | Suganuma | B60L 53/30 |
| | | | | 701/119 |
| 2013/0054080 | A1 * | 2/2013 | Jacobson | B60L 53/80 |
| | | | | 701/32.4 |
| 2013/0197766 | A1 * | 8/2013 | Kurikuma | E02F 9/2246 |
| | | | | 701/50 |
| 2013/0204471 | A1 * | 8/2013 | O'Connell | B60L 53/68 |
| | | | | 701/22 |
| 2014/0117934 | A1 * | 5/2014 | Kurikuma | H02J 7/007182 |
| | | | | 320/109 |
| 2015/0066279 | A1 * | 3/2015 | Kamen | B60L 58/12 |
| | | | | 701/22 |
| 2015/0361627 | A1 * | 12/2015 | Frelich | B60W 10/30 |
| | | | | 180/65.245 |
| 2016/0118828 | A1 * | 4/2016 | Berry | E21C 31/12 |
| | | | | 307/10.1 |
| 2016/0129793 | A1 * | 5/2016 | Cronie | H02J 50/90 |
| | | | | 320/109 |
| 2016/0236583 | A1 * | 8/2016 | Kamen | B60L 53/665 |
| 2016/0250941 | A1 * | 9/2016 | O'Connell | B60L 53/51 |
| | | | | 320/104 |
| 2016/0250943 | A1 * | 9/2016 | O'Connell | B60L 58/12 |
| | | | | 701/22 |
| 2016/0288664 | A1 | 10/2016 | Biagini et al. | |
| 2017/0113543 | A1 * | 4/2017 | Pelarski | B60K 13/04 |
| 2017/0136887 | A1 * | 5/2017 | Ricci | B60L 53/14 |
| 2017/0136903 | A1 * | 5/2017 | Ricci | B64D 39/00 |
| 2017/0136904 | A1 * | 5/2017 | Ricci | B60L 53/38 |
| 2017/0346322 | A1 * | 11/2017 | Kuran | H01M 10/482 |
| 2017/0355271 | A1 * | 12/2017 | Cronie | B60L 53/12 |
| 2018/0086212 | A1 * | 3/2018 | Dudar | B60L 53/12 |
| 2018/0105054 | A1 * | 4/2018 | Fan | H02J 50/80 |
| 2018/0105056 | A1 * | 4/2018 | Fan | H02J 7/00 |
| 2018/0126858 | A1 * | 5/2018 | Blum | B60L 53/30 |
| 2018/0201148 | A1 * | 7/2018 | Donnelly | G05D 1/0088 |

(56) References Cited

U.S. PATENT DOCUMENTS

| | | | |
|---|---|---|---|
| 2018/0204161 A1* | 7/2018 | Sandulescu | G05D 1/0282 |
| 2019/0001833 A1* | 1/2019 | Coburn | B60L 53/66 |
| 2019/0047433 A1* | 2/2019 | Rozman | B60W 20/00 |
| 2019/0132719 A1* | 5/2019 | Mizutani | B60L 53/36 |
| 2019/0132720 A1* | 5/2019 | Mizutani | G05D 1/0088 |
| 2019/0143828 A1* | 5/2019 | Sawada | G06Q 10/02 |
| | | | 340/934 |
| 2019/0205842 A1* | 7/2019 | Starns | G05D 1/0088 |
| 2019/0217735 A1* | 7/2019 | Donnelly | B60L 53/36 |
| 2019/0217736 A1* | 7/2019 | Donnelly | B60L 53/64 |
| 2019/0217737 A1* | 7/2019 | Lotfy | G06Q 10/02 |
| 2019/0263271 A1* | 8/2019 | Ashby | G06Q 40/04 |
| 2019/0315236 A1* | 10/2019 | Mere | H02J 7/342 |
| 2019/0351783 A1* | 11/2019 | Goei | B60L 53/665 |
| 2019/0389314 A1* | 12/2019 | Zhu | B60L 53/14 |
| 2019/0389315 A1* | 12/2019 | Zhu | B60L 53/64 |
| 2020/0001732 A1* | 1/2020 | Nohra | B60L 53/60 |
| 2020/0067334 A1* | 2/2020 | Fan | B60L 53/32 |
| 2020/0148070 A1* | 5/2020 | Takebayashi | B60L 53/16 |
| 2020/0215924 A1* | 7/2020 | Kamen | B60L 58/12 |
| 2020/0215929 A1* | 7/2020 | Javaid | B60L 53/38 |
| 2020/0231058 A1* | 7/2020 | Hishida | B60L 55/00 |
| 2020/0262305 A1 | 8/2020 | Chakraborty et al. | |
| 2020/0262307 A1* | 8/2020 | Rosene | H04L 67/52 |
| 2020/0282857 A1* | 9/2020 | Mortensen | B60L 53/16 |
| 2020/0353833 A1* | 11/2020 | Kim | H02J 7/0045 |
| 2020/0376972 A1* | 12/2020 | Martin | B60L 53/57 |
| 2020/0404470 A1* | 12/2020 | Mizutani | B60L 53/14 |
| 2021/0008994 A1* | 1/2021 | Choi | B60L 53/66 |
| 2021/0008997 A1* | 1/2021 | Marsolek | B60L 53/31 |
| 2021/0025132 A1* | 1/2021 | Ishii | B60L 53/14 |
| 2021/0025728 A1* | 1/2021 | Thum | G01C 21/3664 |
| 2021/0170903 A1* | 6/2021 | Tsuchiya | B60L 58/16 |
| 2021/0200243 A1* | 7/2021 | Chen | G05D 1/646 |
| 2021/0206279 A1* | 7/2021 | North | H02J 7/0045 |
| 2021/0273466 A1* | 9/2021 | Robinson | H02J 7/0042 |
| 2021/0284043 A1* | 9/2021 | Wang | B60L 58/20 |
| 2021/0291691 A1* | 9/2021 | Lu | B60L 53/63 |
| 2021/0291692 A1* | 9/2021 | Masoud | H02J 50/05 |
| 2021/0316625 A1* | 10/2021 | Oetken | B60L 53/30 |
| 2021/0347275 A1* | 11/2021 | Chakraborty | G06Q 10/06315 |
| 2021/0382501 A1* | 12/2021 | Cheung | G06Q 50/06 |
| 2022/0024330 A1* | 1/2022 | Books | B60L 53/57 |
| 2022/0069611 A1* | 3/2022 | Harris | B60L 53/305 |
| 2022/0105819 A1* | 4/2022 | Donnelly | B60L 53/38 |
| 2022/0120569 A1* | 4/2022 | Gerrese | G01C 21/3461 |
| 2022/0258632 A1* | 8/2022 | Ehrenhalt | B60L 53/67 |
| 2022/0332210 A1* | 10/2022 | Goei | B60L 53/53 |
| 2022/0363157 A1* | 11/2022 | Nakagawa | B25J 9/1679 |
| 2022/0410872 A1* | 12/2022 | Salter | B60L 53/66 |
| 2023/0048233 A1* | 2/2023 | Salter | B60L 53/65 |
| 2023/0066635 A1* | 3/2023 | Chandrasekaran | B60W 30/146 |
| 2023/0083236 A1* | 3/2023 | Kumar | H02P 3/18 |
| | | | 307/10.1 |
| 2023/0112291 A1* | 4/2023 | Frelich | B60L 58/12 |
| | | | 180/53.5 |
| 2023/0113279 A1* | 4/2023 | Romero | B60L 58/12 |
| | | | 701/50 |
| 2023/0117372 A1* | 4/2023 | Marsolek | B60L 1/08 |
| | | | 702/63 |
| 2023/0191915 A1* | 6/2023 | Wulf | B60L 55/00 |
| | | | 191/2 |
| 2023/0195141 A1* | 6/2023 | Cheung | G06Q 10/06315 |
| | | | 701/23 |
| 2023/0202334 A1* | 6/2023 | Yiu | B60L 58/12 |
| | | | 700/295 |
| 2023/0234464 A1* | 7/2023 | Nasr | H02J 7/0042 |
| | | | 701/22 |
| 2023/0246467 A1* | 8/2023 | Salter | B60L 58/14 |
| | | | 320/109 |
| 2023/0246471 A1* | 8/2023 | Salter | B60L 53/67 |
| | | | 320/109 |
| 2023/0256842 A1* | 8/2023 | Robinson | B60L 53/18 |
| | | | 701/22 |
| 2023/0322114 A1* | 10/2023 | Lu | B60L 53/68 |
| | | | 320/109 |
| 2023/0339354 A1* | 10/2023 | Kraeling | B60L 53/68 |
| 2024/0059173 A1* | 2/2024 | Hanson | B60L 53/66 |
| 2024/0140211 A1* | 5/2024 | Ropel | B60L 53/62 |
| 2024/0140218 A1* | 5/2024 | Ropel | B60L 53/12 |
| 2024/0140245 A1* | 5/2024 | Ropel | B60L 53/66 |
| 2024/0227774 A1* | 7/2024 | Marsolek | B60W 50/14 |
| 2024/0246429 A1* | 7/2024 | Nasr | B60L 53/65 |
| 2024/0332970 A1* | 10/2024 | Gorman | B60L 7/10 |
| 2024/0375637 A1* | 11/2024 | Nelson | B60W 10/06 |
| 2025/0033512 A1* | 1/2025 | Twigger | B60L 53/11 |
| 2025/0042274 A1* | 2/2025 | Harrenstein | B60L 58/12 |

FOREIGN PATENT DOCUMENTS

| | | | |
|---|---|---|---|
| JP | 2016084633 A * | 5/2016 | |
| WO | 2019/226630 A1 | 11/2019 | |

* cited by examiner

200

Generate worksite plan — S202

Operate 1st and 2nd machines — S204

S206
Monitor power level of 1st and 2nd machines

S218
Output warning

S208
Is power of 1st or 2nd less than needed?

No

Yes

S210
Does charging 1st or 2nd take priority?

No

From 300

Yes

S212
Move 2nd to 1st or 1st to 2nd and charge

S214
Is 1st or 2nd sufficiently charged?

Yes

No

S216
Return 1st or 2nd

SYSTEM, APPARATUS, AND METHOD FOR MACHINE-TO-MACHINE CHARGING AT A WORKSITE

TECHNICAL FIELD

Embodiments of the disclosed subject matter relate to systems, apparatuses, and methods for machine-to-machine charging at a worksite.

BACKGROUND

International Publication No. WO2019226630A1, published Nov. 28, 2019, discloses connections between vehicles for vehicle-to-vehicle charging in general.

German Patent Application Publication DE102013104211 A1, published Oct. 30, 2014, and entitled "Road paver or feeder, compressor, and method for operating a construction machine System" discloses switching entire energy storage devices between machines. This involves exchanging energy storage devices using a loading station and requires the energy storage devices in the machines are interchangeable.

U.S. Patent Publication No. 20210008997, published Jan. 14, 2021, and entitled "System and method for charging machines" discloses centrally controlling machines on a worksite to return to a charging zone and control the amount of charge received based on the paving plan and perimeter of the worksite.

SUMMARY

According to an aspect of the present disclosure a paving system is disclosed or implemented. The paving system may include a first machine configured to perform a first act on paving material at a worksite, the first machine being powered, at least in part, by a first energy accumulator, a second machine configured to perform a second act on paving material at the worksite, second first machine being powered, at least in part, by a second energy accumulator, a first location sensor connected to the first machine and configured to determine a current location of the first machine at the worksite, a second location sensor connected to the second machine and configured to determine a current location of the second machine at the worksite, and control circuitry. The control circuitry is configured to operate the first and second machines at the worksite based at least in part on a worksite plan including a first total amount of power for the first machine to complete the first task and a second total amount of power for the second machine to complete the second task, determine a first remaining amount of power in the first energy accumulator and a second remaining amount of power in the second energy accumulator, and, on condition that one of the first remaining amount of power is less the first total amount of power and charging of the first machine takes priority over performing of the second task, send the second machine to the first machine and charge the first energy accumulator.

According to another aspect of the present disclosure system control circuitry is disclosed or implemented. System control circuitry is configured operate the first and second machines at the worksite based at least in part on a worksite plan including a first total amount of power for the first machine to complete the first task and a second total amount of power for the second energy machine to complete the second task, determine a first remaining amount of power in the first energy accumulator and a second remaining amount of power in the second energy accumulator, and on condition that one of the first remaining amount of power is less the first total amount of power and charging of the first machine takes priority over performing of the second task, send the second machine to the first machine and charge the first energy accumulator.

And in another aspect of the present disclosure is a method for controlling machines at a worksite. The method includes operating the first and second machines at the worksite based at least in part on a worksite plan including a first total amount of power for the first machine to complete the first task and a second total amount of power for the second machine to complete the second task, determining a first remaining amount of power in a first energy accumulator of the first machine and a second remaining amount of power in a second energy accumulator of the second machine, and, on condition that one of the first remaining amount of power is less the first total amount of power and charging of the first machine takes priority over performing of the second task, send the second machine to the first machine and charge the first energy accumulator.

DETAILED DESCRIPTION

Embodiments of the disclosed subject matter relate to systems, apparatuses, and methods for using power generated by an integrated generator of a machine, e.g., a paving machine, to charge one or more other machines at a worksite.

Currently, many worksites are full of electric machines that need to be charged. Thus, there is a need for a mobile charging station or any other equipment to keep the electric machines charged. This is particularly a problem in areas that are far away from any electrical infrastructure. There is also an additional constraint on such jobsites other than just power levels of individual machines, but also determining the amount of charge needed to complete a planned task and/or return to a trailer and/or reach a charging station. For example, an asphalt paver needs to finish the paving task so that any hot asphalt is not wasted and so that the asphalt mat ends up smooth and uninterrupted. As another example, if a milling machine is cutting a particular groove pattern into the road, the mill needs to keep cutting uninterrupted so that the pattern is even and continuous.

Quick charge power transfer from one machine to another can occur by wired charging from machine to machine or through wireless power transfer from machine to machine. A power transfer device may be as simple as wires to transfer power from one machine to another. A quick power transfer device may include an electronics device that can use the batteries and turn them into a quick transfer feature that allows for transfer of power from one machine to another. This quick power transfer device may use components, e.g., capacitors, super capacitors, rewiring batteries together, etc. This quick power transfer device could utilize the entire battery pack or a portion of it. The battery pack could also be a variety of types and the quick transfer device could be tailored to the specific battery type.

A system for powering an electric vehicle/work machine is disclosed. The system can include a power transfer device configured to transfer electric power from one vehicle to another vehicle either by utilizing wires or through wireless charging. The power transfer device may include electronic devices (e.g., capacitors, super capacitors) which are configured to utilize a battery pack for transfer of the electric power. The system may utilize an entire battery pack or a portion of the battery pack for transferring the electric power.

First, a general layout of worksite will be described with reference to FIG. 1. Then, with reference to FIGS. 2 and 3, a basic flow chart of a control method according to one or more embodiments of the present disclosure will be described.

Figure 1:
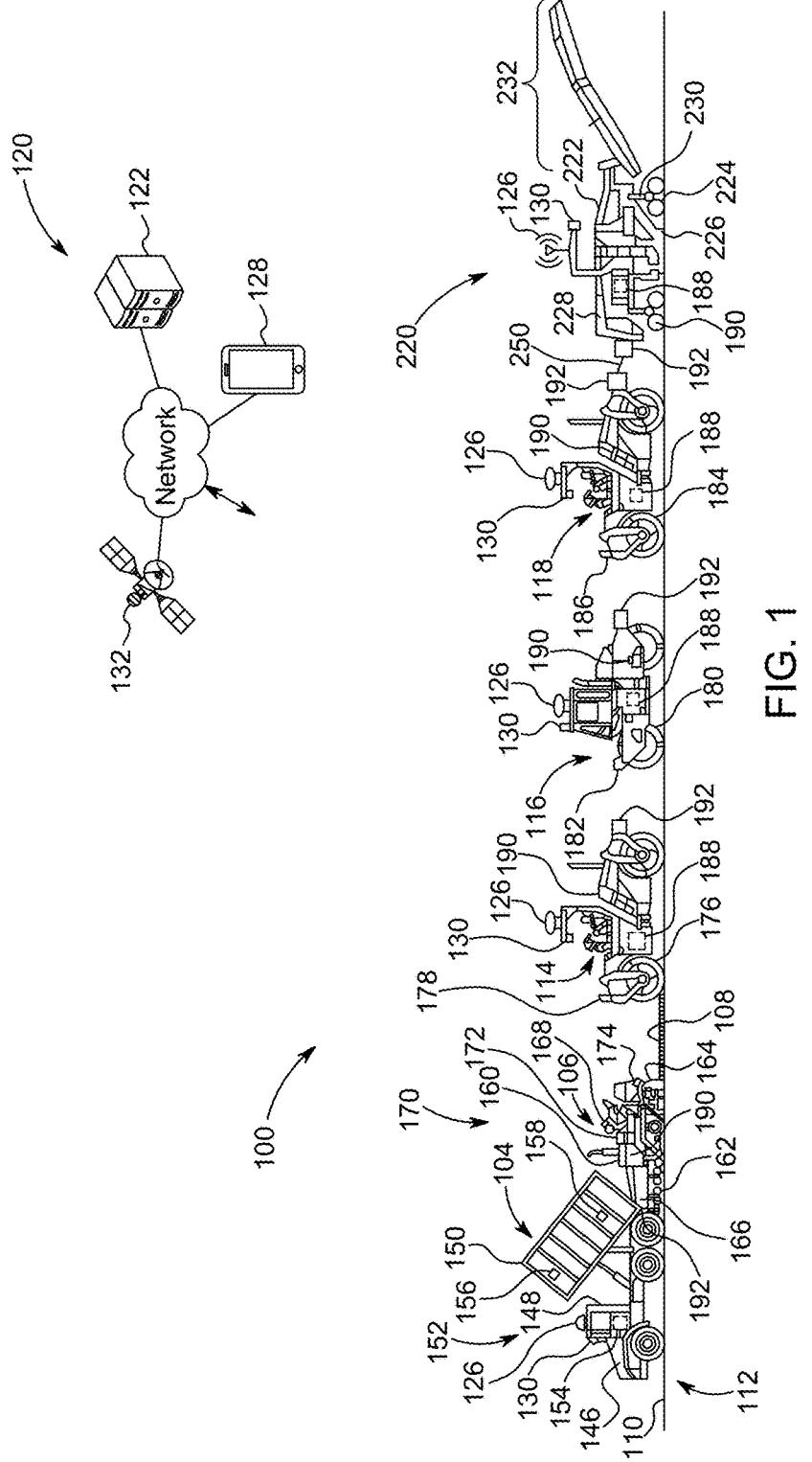
FIG. 1 is a schematic illustration of a worksite according to one or more embodiments of the present disclosure.

FIG. 1 is a schematic illustration of an example system may include one or more machines configured to perform paving, construction, farming, mining, or other operations. Such a system may be, e.g., a paving system 100 for use on a work surface 110 of a worksite 112. As shown in FIG. 1, an example paving system 100 may include a plurality of machines such as one or more haul trucks 104 and/or one or more paving machines 106. For instance, one or more haul trucks 104 may be loaded with a desired amount of paving material, e.g., asphalt, at a paving material plant, which may be on or off the worksite 112. Once a haul truck 104 has delivered the paving material to the worksite 112, the haul truck 104 may transfer the paving material to a hopper or other component of the paving machine 106, and the paving machine 106 may apply the paving material 108 to and/or otherwise deposit the paving material 108 on the work surface 110 in the form of a substantially flat, substantially smooth paving material mat. The paving system 100 may also include one or more other machines, such as one or more compaction machines 114, 116, 118, one or more milling machines 220, remixing transfer vehicles, wheel loaders, excavators, track-type tractors, motor graders, and/ or other construction, mining, or paving machines. In such examples, the one or more compaction machines 114, 116, 118 may be configured to compact the mat of paving material 108 to a desired density. The one or more milling machines 220 may be configured to remove material from the work surface 110. It is understood that the consistency, density, and/or quality of the mat of paving material may be maximized when the paving machine 106 is controlled to operate at a substantially constant speed, and without stopping. Further, the quality of the pattern formed by the milling machine 220 may be maximized when the milling machine 220 is controlled to operate at a substantially constant speed, and without stopping.

Accordingly, to avoid paving machine stoppages and/or milling machine stoppages, embodiments of the present disclosure may be used to monitor, manage, and/or otherwise control the recharging of the haul trucks 104, the paving machines 106, the milling machines 220, the compaction machines 114, 116, 118, and/or other components of the paving system 100 on a substantially continuous basis and in substantially real time. Controlling components of the paving system 100 in this way may minimize work stoppage, which can improve the quality of the mat and the overall efficiency of the paving system 100.

The paving system 100 shown in FIG. 1 may also include a control system 120 and one or more system controllers 122. In some examples, the control system 120 and/or the system controller 122 may be located on or off the worksite 112. In such examples, the control system 120 and/or the system controller 122 may also include components located, e.g., on any one or more of the machines of the paving system 100, at the worksite 112, and/or at a remote command center. In any of the examples described herein, the functionality of system controller 122 may be distributed so that certain operations are performed at the worksite 112 and other operations are performed remotely. For example, some operations of the system controller 122 may be performed at the worksite 112, on one or more of the haul trucks 104, on one or more of the paving machines 106, etc. It is understood that the system controller 122 may comprise a component of the paving system 100, one or more of the haul trucks 104, one or more of the paving machines 106, one or more of the compaction machines 114, 116, 118, one or more of the milling machines 220, a component of a separate mobile device (e.g., a mobile phone, a tablet, a laptop computer, etc.), and/or the control system 120.

The system controller 122 may be an electronic controller that operates in a logical fashion to perform operations, execute control algorithms, store and retrieve data and other desired operations. The system controller 122 may include or access memory, secondary storage devices, processors, and any other components for running an application. The memory and secondary storage devices may be in the torn of read-only memory ROM) or random access memory (RAM) or integrated circuitry that is accessible by the controller. Various other circuits may be associated with the system controller 122 such as power supply circuitry, signal conditioning circuitry, driver circuitry, and other types of circuitry.

The system controller 122 may be a single controller or may include more than one controller (such as additional controllers associated with each of the haul trucks 104, paving machines 106, compaction machines 114, 116, 118, milling machines 220, and/or other machines of the paving system 100) configured to control various functions and/or features of the paving system 100. As used herein, the term "controller" is meant in its broadest sense to include one or more controllers and/or microprocessors that may be associated with the paving system 100, and that may cooperate in controlling various functions and operations of the machines of the paving system 100. The functionality of the system controller 122 may be implemented in hardware and/or software without regard to the functionality. The system controller 122 may rely on one or more data maps relating to the operating conditions and the operating environment of the paving system 100 that may be stored in the memory of the system controller 122. Each of these data maps may include a collection of data in the form of tables, graphs, and/or equations to maximize the performance and efficiency of the paving system 100 and its operation.

It is also understood that the various haul trucks 104, paving machines 106, compaction machines 114, 116, 118, milling machines 220, and/or other components of the paving system 100 may include respective controllers, and each of the respective controllers may be in communication and/or may otherwise be operably connected via the network 124. For example, the network 124 may include a component of a wireless communication system of the paving system 100, and as part of such a wireless communication system, the one or more haul trucks 104, the paving machine 106, the one or more compaction machines 114, 116, 118, the milling machines 220, and/or other components of the paving system 100 may include respective communication devices 126. Such communication devices 126 may be configured to permit wireless transmission of a plurality of signals, instructions, and/or information between the haul trucks 104, the paving machines 106, the compaction machines 114, 116, 118, and the system controller 122, as well as to permit communication with other machines and systems remote from the worksite 112. For example, such communication devices 126 may include a transmitter configured to transmit signals to a receiver of one or more other such communication devices 126. In such examples, each communication device 126 may also include a receiver configured to receive such signals. In some examples, the transmitter and the receiver of a particular communication device 126 may be combined as a transceiver or other such component. In any of the examples described herein, such communication devices 126 may also enable communication with one or more tablets, computers, cellular/wireless telephones, personal digital assistants, mobile devices, or other electronic devices 128 located at the worksite 112 and/or remote from the worksite 112. Such electronic devices 128 may include, e.g., mobile phones and/or tablets of project managers (e.g., foremen) overseeing daily paving operations at the worksite 112.

The network 124, communication devices 126, and/or other components of the wireless communication system described above may implement or utilize any desired system or protocol including any of a plurality of communications standards. The desired protocols will permit communication between the system controller 122, one or more of the communication devices 126, and/or any other desired machines or components of the paving system 100. Examples of wireless communications systems or protocols that may be used by the paving system 100 described herein include a wireless personal area network such as Bluetooth® (e.g., IEEE 802.15), a local area network such as IEEE 802.11b or 802.11g, a cellular network, or any other system or protocol for data transfer. Other wireless communication systems and configurations are contemplated. In some instances, wireless communications may be transmitted and received directly between the control system 120 and a machine (e.g., paving machine 106, haul truck 104, milling machine 220, etc.) of the paving system 100 or between such machines. In other instances, the communications may be automatically routed without the need for re-transmission by remote personnel.

In example embodiments, one or more machines of the paving system 100 (e.g., the one or more haul trucks 104, the paving machine 106, the one or more compaction machines 114, 116, 118, the milling machine 220, etc.) may include a location sensor 130 configured to determine a location and/or orientation of the respective machine. In such embodiments, the communication device 126 of the respective machine may be configured to generate and/or transmit signals indicative of such determined locations and/or orientations to, for example, the system controller 122 and/or to the other respective machines of the paving system 100. In some examples, the location sensors 130 of the respective machines may include and/or comprise a component of global navigation satellite system (GNSS) or a global positioning system (GPS). Alternatively, universal total stations (UTS) may be utilized to locate respective positions of the machines. In example embodiments, one or more of the location sensors 130 described herein may include a GPS receiver, transmitter, transceiver, laser prisms, and/or other such device, and the location sensor 130 may be in communication with one or more GPS satellites 132 and/or UTS to determine a respective location of the machine to which the location sensor 130 is connected continuously, substantially continuously, or at various time intervals. One or more additional machines of the paving system 100 may also be in communication with the one or more GPS satellites 132 and/or UTS, and such GPS satellites 132 and/or UTS may also be configured to determine respective locations of such additional machines. In any of the examples described herein, machine locations determined by the respective location sensors 130 may be used by the system controller 122 and/or other components of the paving system 100 to coordinate activities of the haul trucks 104, paving machine 106, compaction machines 114, 116, 118, milling machine 220 and/or other components of the paving system 100. For example, machine locations determined by the respective location sensors 130 may be used by the system controller 122 and/or other components of the paving system 100 to determine travel paths, return paths, progress (e.g., a completion percentage) associated with a worksite plan, a return power required for one or more machines of the paving system 100 to traverse a return path, and/or other parameters described herein. Such parameters may be useful in minimizing and/or avoiding work stoppages caused by, for example, refueling and/or recharging of one or more machines of the paving system 100.

Each haul truck 104 may include a truck control system 152 and a truck controller 154 generally similar or identical to the control system 120 and the system controller 122, respectively. The truck control system 152 and the truck controller 154 may be located on the haul truck 104 and may also include components located remotely from the haul truck 104 such as on any of the other machines of the paving system 100 or at a command center. For example, the truck controller 154 may include one or more processors, one or more hard drives, memory, or other storage devices, and/or other components. The functionality of truck controller 154 may be distributed so that certain functions are performed on the haul truck 104 and other functions are performed remotely. In some examples, the truck control system 152 and/or the truck controller 154 may enable autonomous and/or semi-autonomous control of the haul truck 104. As used herein, an "autonomous" machine of the paving system 100 may comprise a machine (e.g., a haul truck 104, a paving machine 106, a compaction machine 114, 116, 118, milling machine 220, etc.) configured to traverse a travel path and/or perform various tasks or operations (e.g., lifting, dumping, paving, compacting paving material, etc.) without operator control or input. In such examples, the system controller 122 and/or a respective controller of the autonomous machine may substantially completely control such machine operations based on instructions, stored logic/programs, learning algorithms, or other components. As used herein, a "semi-autonomous" machine of the paving system 100 may comprise a machine configured to traverse a travel path and/or perform various tasks or operations upon receiving input and/or approval from an operator. In such examples, the system controller 122 and/or a respective controller of the semi-autonomous machine may substantially completely control such machine operations based on instructions, stored logic/programs, learning algorithms, or other components in combination with receipt of one or more inputs from an operator.

The haul truck 104 may also be equipped with a plurality of sensors connected to and/or otherwise in communication with the truck controller 154 and/or with the system controller 122. Such sensors may be configured to provide data indicative (directly or indirectly) of various operating parameters of the haul truck 104, systems associated with the haul truck 104, and/or the worksite 112 and/or other environment in which the haul truck 104 is operating. In any of the examples described herein, such sensors may include components of the truck control system 152, the control system 120, and/or the paving system 100, generally. For example, as noted above, the haul truck 104 may be equipped with a location sensor 130 configured to sense, detect, and/or otherwise determine a location and/or orientation of the haul truck 104. The location sensor 130 may include a plurality of individual sensors that cooperate to generate and provide location signals to the truck controller 154 and/or to the system controller 122 indicative of the location and/or orientation of the haul truck 104. In some examples, the location sensor 130 may be fixed to the cab 148, the chassis 146, and/or any other component of the haul truck 104. In other examples, however, the location sensor 130 may be removably attached to the haul truck 104 and/or disposed within, for example, the cab 148 of the haul truck 104 during operation of the haul truck 104. In some examples, the haul truck 104 may also include a load sensor 156 configured to sense, measure, and/or otherwise determine the load or amount of paving material 108 disposed within the dump body 150. The haul truck 104 may further include a temperature sensor 158 configured to sense, measure, and/or otherwise determine the temperature of the load (e.g., paving material 108) within the dump body 150.

The paving machine 106 may include a frame 160 having a set of ground engaging wheels or tracks 162 mounted thereto, as well as a screed 164 for spreading paving material 108 across a width of the work surface 110. The paving machine 106 may further include a hopper 166 for storing paving material 108 supplied by the haul truck 104 or another supply machine, and a conveyor system which transfers paving material 108 from the hopper 166 to the screed 164. The paving machine 106 may further include a display 168, such as an LCD display. The display 168 may be mounted to the frame 160 for viewing by an operator. In an example embodiment, the display 168 may be configured to display a map of the worksite 112 including icons or other visual indicia representing the work surface 110, the paving machine 106, the haul truck 104, one or more of the compaction machines 114, 116, 118, and/or other components of the paving system 100.

The paving machine 106 may also include a paving machine control system 170 and a paving machine controller 172 generally similar or identical to the control system 120 and the system controller 122, respectively. The paving machine control system 170 and the paving machine controller 172 may be located on the paving machine 106 and may also include components located remotely from the paving machine 106 such as on any of the other machines of the paving system 100, at a paving material plant, or at a command center. For example, the paving machine controller 172 may include one or more processors, one or more hard drives, memory, or other storage devices, and/or other components. The functionality of paving machine controller 172 may be distributed so that certain functions are performed on the paving machine 106 and other functions are performed remotely. In some examples, the paving machine control system 170 and/or the paving machine controller 172 may enable autonomous and/or semi-autonomous control of the paving machine 106.

The paving machine 106 may also be equipped with a plurality of sensors connected to and/or otherwise in communication with the paving machine controller 172 and/or with the system controller 122. Such sensors may be configured to provide data indicative (directly or indirectly) of various operating parameters of the paving machine 106, systems associated with the paving machine 106, and/or the worksite 112, and/or other environments in which the paving machine 106 is operating. In any of the examples described herein, such sensors may comprise components of the paving machine control system 170, the control system 120, and/or the paving system 100, generally. For example, in addition to the location sensor 130 and communication device 126 described above, the paving machine 106 may also include a temperature sensor 174 mounted, for example, on or proximate the screed 164. The temperature sensor 174 may be positioned and/or otherwise configured to determine the temperature of the mat of paving material 108 deposited on the work surface 110 by the screed 164.

As noted above, the paving system 100 may include one or more compaction machines 114, 116, 118 configured to compact the mat of paving material 108 deposited by the paving machine 106. In some examples, the compaction machine 114 may include a "breakdown" compactor having a breakdown drum 176, and the compaction machine 114 may be configured to follow relatively closely behind the paving machine 106, such that the breakdown drum 176 can compact paving material 108 distributed by the paving machine 106 while the paving material 108 is still relatively hot. Compacting with the compaction machine 114 when the paving material 108 is still relatively hot allows the breakdown drum 176 of the compaction machine 114 to perform a relatively large proportion of the total compaction desired for a particular lift of paving material 108, as relatively hotter asphalt in the paving material 108 can flow relatively readily and is thus readily compacted.

In addition to the communication device 126 and the location sensor 130 described above, the compaction machine 114 may further include any number of additional sensors configured to assist the compaction machine 114 in performing various paving (e.g., compaction) tasks. For example, such sensors may include one or more accelerometers or vibration sensors configured to sense the level of vibration (e.g., impacts per foot) imparted by the breakdown drum 176. The compaction machine 114 may also include a temperature sensor 178 mounted thereon and configured to sense, measure, and/or otherwise determine a temperature of the paving material 108 with which the compaction machine 114 is interacting or with which it has interacted. In some examples, the temperature sensor 178 may be substantially similar to and/or the same as the temperature sensor 174 of the paving machine 106.

The compaction machine 116 may be substantially similar to and/or the same as the compaction machine 114. In some examples, the compaction machine 116 may comprise an "intermediate" compactor, and may include an intermediate drum 180 which compacts paving material 108 already compacted at least once by the compaction machine 114. The compaction machine 116 may include a sensor or other device configured to sense a smoothness and/or stiffness of the paving material 108. Additionally, the compaction machine 116 may include the communication device 126 and the location sensor 130 described above, as well as any number of additional sensors configured to assist the compaction machine 116 in performing various paving (e.g., compaction) tasks. For example, such sensors may include one or more accelerometers or vibration sensors configured to sense the level of vibration (e.g., impacts per foot) imparted by the intermediate drum 180. The compaction machine 116 may also include a temperature sensor 182 mounted thereon and configured to sense, measure, and/or otherwise determine a temperature of the paving material 108 with which the compaction machine 116 is interacting or with which it has interacted. In some examples, the temperature sensor 182 may be substantially similar to and/or the same as the temperature sensor 174 of the paving machine 106.

The compaction machine 118 may also be substantially similar to and/or the same as the compaction machine 114. In some examples, the compaction machine 118 may comprise a "finishing" compactor, and may include a finish drum 184 configured to perform a final squeeze of the paving material 108. In such examples, the compaction machine 118 may be configured to follow relatively closely behind compaction machine 116. In some instances, it will be desirable to compact paving material 108 with the compaction machine 118 prior to its cooling below a temperature in the range of about 50 degrees Celsius to about 65 degrees Celsius. To this end, the compaction machine 118 may also include a temperature sensor 186 to verify whether the final compaction is taking place at an appropriate paving material temperature. As noted above with respect to the compaction machines 114, 116, the compaction machine 118 may also include a communication device 126 and a location sensor 130, as well as any number of additional sensors configured to assist the compaction machine 118 in performing various paving (e.g., compaction) tasks. For example, such sensors may include one or more accelerometers or vibration sensors.

As noted above, the paving system 100 may include the milling machine 220 configured to remove portions of the work surface 110. The milling machine 220 may include a frame 222 supported by one or more traction devices 224, a milling drum 226 rotationally supported under a belly of frame 222, and an engine 228 mounted to frame 222 and configured to drive milling drum 226 and traction devices 224. Traction devices 224 may include either wheels or tracks connected to actuators 230 that are adapted to controllably raise and lower frame 222 relative to surface 110. It should be noted that, in the disclosed embodiment, raising and lowering of frame 222 may also function to vary a milling depth of milling drum 226 into work surface 110. A conveyor system 232 may be pivotally connected at a leading end to frame 222 and configured to transport material away from milling drum 226 and into a receptacle, such as a haul truck 104. Other types of receptacles may be used, if desired.

In addition to the communication device 126 and the location sensor 130 described above, the milling machine 220 may further include any number of additional sensors configured to assist the milling machine 220 in performing various paving (e.g., milling) tasks. For example, the milling machine 220 may include a speed sensor, a depth sensor, one or more material measurement sensors, a bit wear sensor, and the like.

As noted above, one or more machines of the paving system 100 may include respective controllers configured to control various operations of the machine. Such controllers may be utilized, for example, to assist in controlling the autonomous and/or semi-autonomous machines of the paving system 100 described herein. For example, one or more of the compaction machines 114, 116, 118 and the milling machine 220 may include a respective controller 188, and the controller 188 may be substantially similar to and/or the same as the truck controller 154 and/or the paving machine controller 172 described above. For example, the controller 188 may include a compaction machine controller or a milling machine controller, and the controller 188 may be located on the one or more compaction machines 114, 116, 118 or non the milling machine 220. The controller 188 may also include components located remotely from the one or more of the compaction machines 114, 116, 118, and the milling machine, such as on any of the other machines of the paving system 100 or at a command center. For example, the controller 188 may include one or more processors, one or more hard drives, memory, or other storage devices, and/or other components. The functionality of the controller 188 may be distributed so that certain functions are performed on the one or more of the compaction machines 114, 116, 118, or on the milling machine 220, and other functions may be performed remotely. In some examples, the controller 188 may enable autonomous and/or semi-autonomous control of the respective compaction machine 114, 116, 118 or the milling machine 220 to which it is operably connected Each machine of the paving system may be powered by electric motors as the prime or secondary power source using power stored in one or more energy storage device 190. The energy storage device 190 may be an energy accumulator that accepts, stores, and releases energy on demand. The energy storage in the energy accumulator may be based on electrical, e.g., capacitors, electrochemical, e.g., rechargeable batteries, and so forth, that require periodic recharging for continued operation. One or more machines of the paving system 100 may also include a coupling device 192 operably connected to the energy storage device 190 of the respective machine. In such examples, the coupling device 192 may be configured to receive energy or to transmit energy of the energy storage device 190 of the respective machine to recharge the energy storage device 190 of the respective machine or to discharge energy to an energy storage device 190 of another machine.

As shown in FIG. 1, the coupling device 192 may include a cable 250, e.g., a retractable cable, to connect the coupling devices 192 to transfer power between respective machines. Alternatively or additionally, the coupling device 192 may include a transceiver configured to transmit and receive electrical power to wirelessly transfer power between electric machines, e.g., through electric (capacitive) or magnetic (inductive) fields. The coupling device 192 may constitute the quick power transfer device.

The system controller 122, the paving machine controller 172, the truck controller 154, and the controllers 188 may include a microprocessor for executing a specified program, which controls and monitors various functions associated with its respective machine and/or the entire system. The microprocessor may include a memory, such as read only memory (ROM), for storing a program or programs, and a random access memory (RAM) which serves as a working memory area for use in executing the program(s) stored in the memory. It is also possible and contemplated to use other electronic components such as a microcontroller, an ASIC (application specific integrated circuit) chip, or any other integrated circuit device.

The system controller 122, the paving machine controller 172, the truck controller 154, and the controllers 188 or portions thereof (e.g., a processor), can be implemented using circuitry. As used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/ software (including digital signal processor(s)), software and memory(ies) that work together to cause an apparatus to perform various functions); and (c) to circuits, such as a microprocessor(s) or a portion of a microprocessor(s), that require software or firmware for operation, even if the software or firmware is not physically present.

INDUSTRIAL APPLICABILITY

As noted above, embodiments of the disclosed subject matter relate to systems, apparatuses, and methods for transmitting power from one machine to another at a worksite. This may be achieved by moving a machine to transmit power to a machine to receive power and transmitting power while the machines are stationary or moving.

Figure 2:
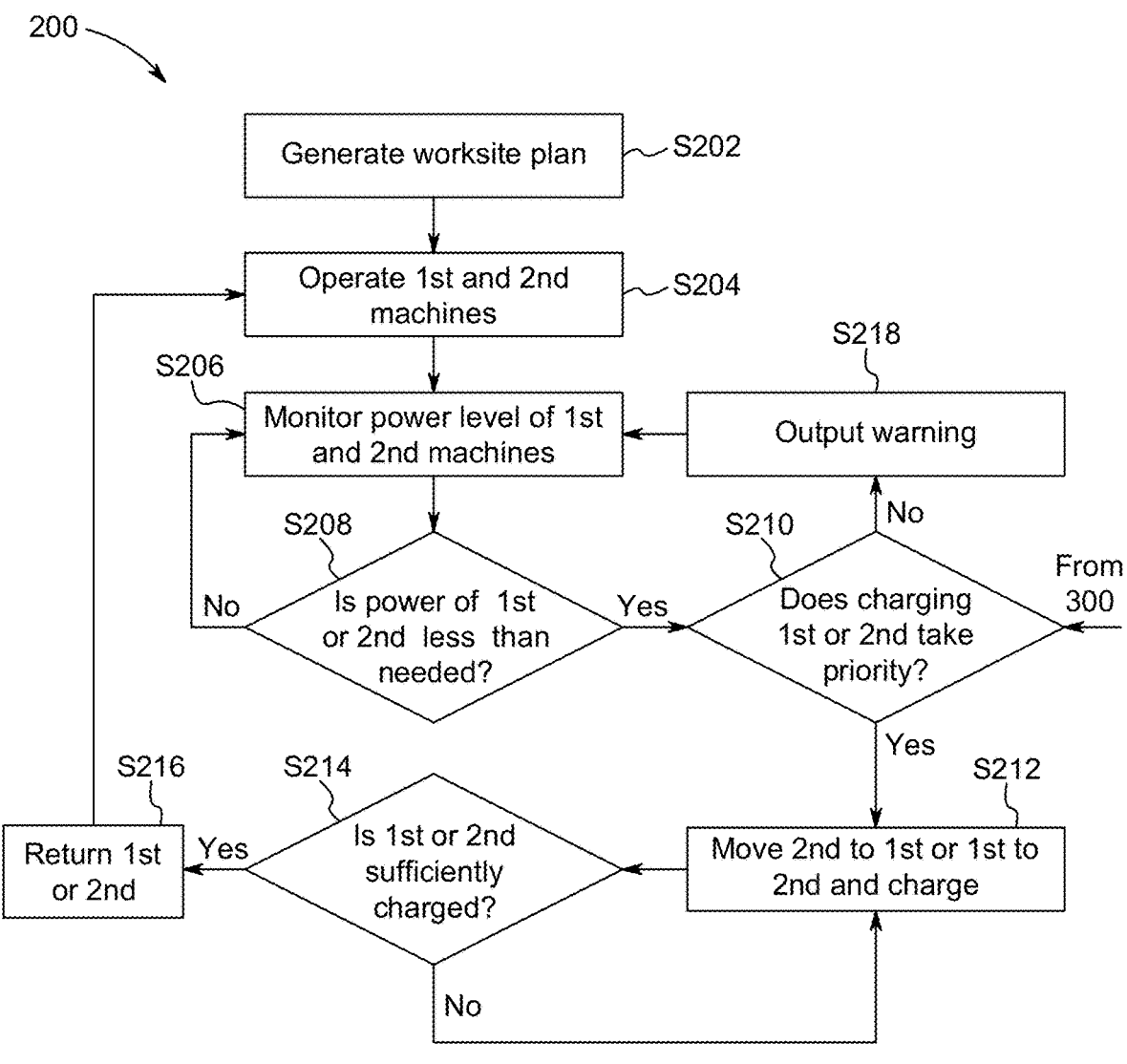
FIG. 2 is flow chart of a control method according to one or more embodiments of the disclosed subject matter.

FIG. 2 is a basic flow chart of a control method 200 according to one or more embodiments of the disclosed subject matter. The control method 200 may be implemented via a non-transitory computer-readable storage medium having stored thereon instructions that, when executed by one or more processors or controllers, cause the one or more processors or controllers to perform the control method 200. The system controller 122, the paving machine controller 172, the truck controller 154, the controllers 188 and/or other centralized monitor in communication with machines of the paving system 100 or portions thereof may perform the method 200. Methods as described herein can include some or all of the operations of the method 200.

Generally, the method 200 can start at operation S202 when a worksite plan is generated. This worksite plan may include an amount of power or charge for each machine to complete its assigned task in the worksite plan. The assigned task may include performing a worksite function of the machine and/or returning to a charging station/trailer/home base. This can mean an additional amount of charge added to an existing battery state or an overall amount of charge to complete the assigned task. For ease and simplicity, the following discussion assumes that only two machines are involved. For example, these may be machines closest to each other or may be one machine for which continuous operation may be more critical, e.g., the paving machine 106 or the milling machine 220, and the compaction machine 114, 116, 118. Some or all machines designated in the worksite plan may be operated and monitored as discussed below.

Then, the first and second machines can be operated at operation S204. A power level in energy accumulators of the first and second machines can be respectively monitored in operation S206. Then, whether the power level of either the first or second machines drops below a level needed to complete the assigned task can be determined in operation S208. If not, the operation can return to operation S206.

If the power level of one of the first and second machines does fall below a level needed to complete the assigned task, whether charging the machine that has the insufficient power level has priority over continuing the task performed by the other machine can be determined in operation S210. Operation S210 may be done manually by a user or automatically in accordance with predetermined parameters discussed below with respect to FIG. 3. If not, the method 200 can proceed to output a warning about power level in operation S218, e.g., to an operator of the machine, the electronic device 128, etc., and/or request a substitute machine to perform its operation, and can return to operation S206. Alternatively, if other machines are on site that may be used to transfer power, the method 200 may proceed to determine the availability of another machine, e.g., a next closest machine, a machine have the most excess power, a machine not currently in use, and so forth, by checking whether charging of the receiving machine has priority over performing a task being performed by the another machine as set forth in FIG. 3.

If it does, then the method 200 can proceed to operation S212, at which the machine can move to the machine needing power and transfers power thereto. Operation S214 can determine whether the machine needing power is sufficiently charged, e.g., to finish its task or proceed to a charging station. If not, the method 200 can return to operation S212 to continue charging. Once the machine is sufficiently charged, the machine that has moved to power the other machine can returns to its position on the worksite (or another predefined or non-defined position) and the method 200 can return to operation S204.

When the machine needing power is to receive power while moving, the first and second machines may be controlled, autonomously, or semi-autonomously, for instance, to synchronize speeds so the two machines can travel at the same speed or within a speed window from each other. In one example, the two machines can be stopped and connected and then the two machines can move together at the same speed. In another example, the machine needing power may be moving at a speed and the other machine to charge the machine needing power can move into position next to and match the speed of the machine needing power. Both determination of the power level of the machines and control of movement of the machines may be realized, e.g., by the control system 120 or other centralized monitor in communication with both machines.

Figure 3:
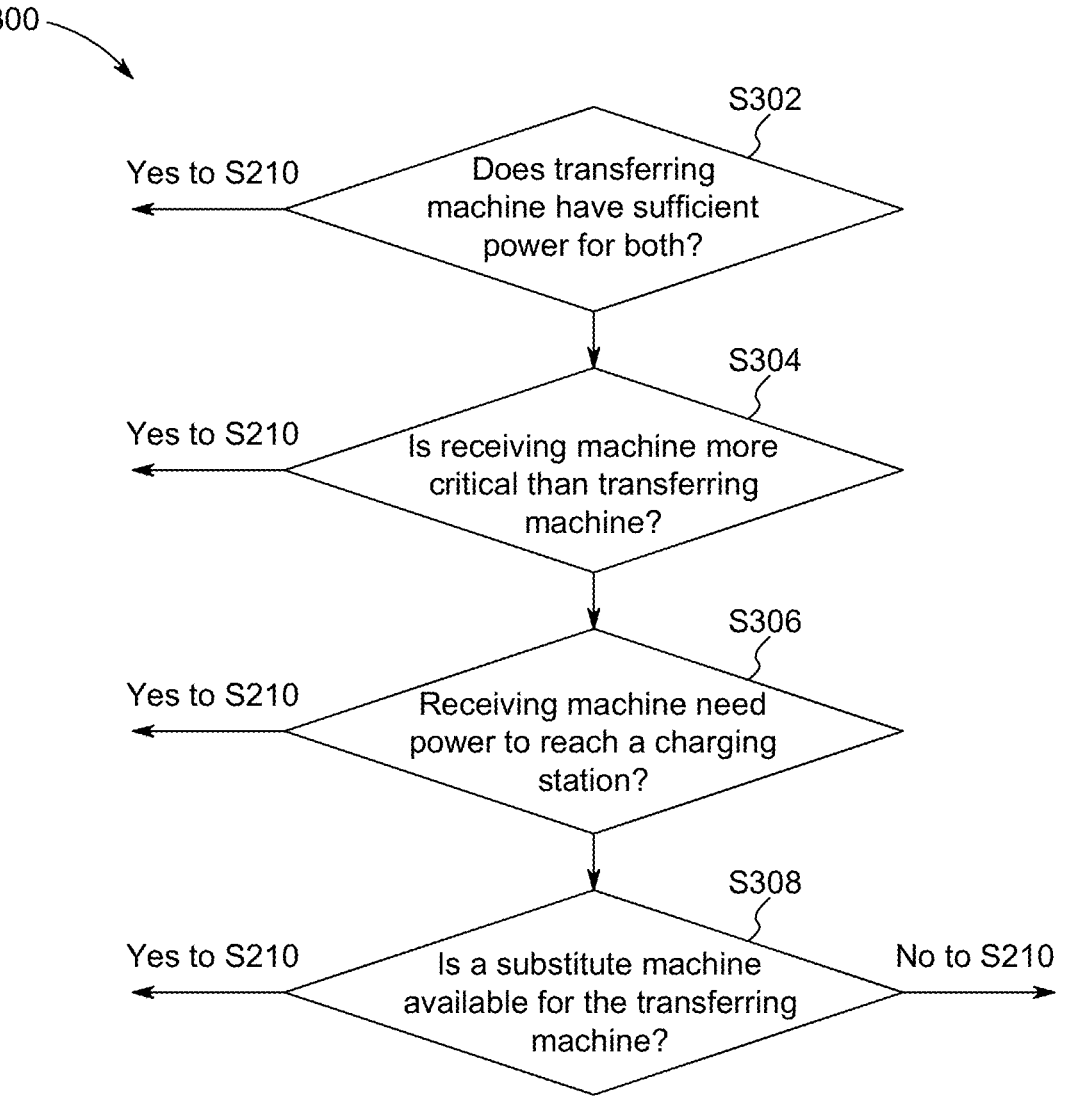
FIG. 3 is flow chart of a priority determination method according to one or more embodiments of the disclosed subject matter.

Automatic priority of charging the machine that needs power may be determined in a method 300 shown in FIG. 3. In operation S302, whether the transferring machine has sufficient power to travel to the receiving machine, supply the receiving machine with needed power, and return to its position (or another position) can be determined, i.e., the transferring machine has power in excess of a total power needed for the transferring machine to perform its task. The power needed to travel and return may be determined using a distance to the receiving machine based on the location sensors and a travel path determined based on a worksite map. The sufficient power may be determined by subtracting power needed for the transferring machine to complete its task from a total power in the energy accumulator of the transferring machine and comparing this excess power to that needed to travel to the receiving machine and back and to charge the receiving machine. If it does, then YES is output to operation S210. If not, operation S304 may determine whether the receiving machine is more critical or important, e.g., whether the receiving machine's loss of power will more adversely affect the paving operation than the loss of power of the transferring machine. If it is, then YES is output to operation S210. If not, then operation S306 may determine whether the receiving machine needs more power to reach a charging station. If it does, then YES is output to operation S210. If not, operation S308 may determine whether a substitute machine is available for the transferring machine. If it is, then YES is output to operation S210. If not, then NO is output to operation S210.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The invention claimed is:

1. A paving system, comprising:
a first machine configured to perform a first planned task on paving material at a worksite, the first machine being powered, at least in part, by a first energy accumulator;
a second machine configured to perform a second planned task on the paving material at the worksite, the second machine being powered, at least in part, by a second energy accumulator;
a first location sensor connected to the first machine and configured to determine a current location of the first machine at the worksite;
a second location sensor connected to the second machine and configured to determine a current location of the second machine at the worksite; and
control circuitry configured to:
operate the first and second machines at the worksite based at least in part on a first total amount of power for the first machine to complete the first planned task and a second total amount of power for the second machine to complete the second planned task,
determine a first remaining amount of power in the first energy accumulator and a second remaining amount of power in the second energy accumulator, and
on condition that the first remaining amount of power is less the first total amount of power for the first machine to complete the first planned task and charging of the first machine takes priority over the second machine performing the second planned task, send the second machine to the first machine and charge the first energy accumulator to at least the first total amount of power for the first machine to complete the first planned task while the first machine continues to perform the first planned task without interruption,
wherein the first and second planned tasks each include physical manipulation of the paving material at the worksite according to respective worksite functions of the first and second machines,
wherein the second energy accumulator charges the first energy accumulator via a wire, and
wherein the second energy accumulator charges the first energy accumulator while the first machine and the second machine are moving.

2. The paving system according to claim 1, wherein the control circuitry is further configured to determine priority of charging the first machine by:

determining whether the second remaining amount of power exceeds the second total amount of power,
determining a second excess power of the second machine based on a difference between the second remaining amount of power and the second total amount of power, and
on condition that the second excess power is sufficient to travel to the first machine, power the first machine, and return to a predetermined position, determining that charging the first machine has priority over performing the second planned task.

3. The paving system according to claim 1, wherein the control circuitry is further configured to determine priority of charging the first machine by:
on condition that operation of the first machine is more critical than operation of the second machine, determining that charging the first machine has priority over performing the second planned task.

4. The paving system according to claim 1, wherein the control circuitry is further configured to determine priority of charging the first machine by:
on condition that the first machine cannot reach a charging station, determining that charging the first machine has priority over performing the second planned task.

5. The paving system according to claim 1, wherein the control circuitry is further configured to, on condition that charging the first machine has priority over performing the second planned task, charge the first machine to the first total amount of power.

6. The paving system according to claim 1, wherein the control circuitry is further configured to, on condition that charging the first machine has priority over performing the second planned task, charge the first machine to a power level sufficient to reach a charging station.

7. The paving system according to claim 1, wherein the control circuitry is remote from the worksite.

8. The paving system according to claim 1, wherein the second energy accumulator charges the first energy accumulator wirelessly.

9. The paving system according to claim 1, wherein the control circuitry is configured to automatically determine whether charging the first machine takes priority over performing the second planned task.

10. System control circuitry that controls paving machines at a worksite, the system control circuitry being configured to:
generate a worksite plan including a first total amount of power for a first paving machine of the paving machines to complete a first planned paving task of the worksite plan at the worksite and a second total amount of power for a second paving machine to complete a second planned paving task of the worksite plan at the worksite different from the first planned paving task, the first and second planned paving tasks each including physical manipulation of paving material at the worksite according to respective worksite functions at the worksite of the first and second paving machines,
operate the first and second paving machines at the worksite based at least in part on the first total amount of power for the first paving machine to complete the first planned paving task and the second total amount of power for second paving machine to complete the second planned paving task,
determine a first remaining amount of power in a first energy accumulator in the first paving machine and a second remaining amount of power in a second energy accumulator in the second paving machine, and on condition that the first remaining amount of power is less the first total amount of power for the first paving machine to complete the first planned paving task and charging of the first paving machine takes priority over completion of the second planned paving task performed by the second paving machine, send the second paving machine to the first paving machine and charge the first energy accumulator using power in the second energy accumulator of the second paving machine to at least the first total amount of power for the first paving machine to complete the first planned paving task while the first machine continues to perform the first planned paving task, wherein the second paving machine is performing the second planned paving task at a time of the condition that the first remaining amount of power being less the first total amount of power and the charging of the first paving machine taking priority over completion of the second planned paving task being performed by the second paving machine.

11. The system control circuitry according to claim 10, further configured to automatically determine whether charging the first machine takes priority over performing the second planned paving task.

12. The system control circuitry according to claim 10, further configured to determine priority of charging the first machine by:

determining whether the second remaining amount of power exceeds the second total amount of power, determining a second excess power of the second machine based on a difference between the second remaining amount of power and the second total amount of power, and on condition that the second excess power is sufficient to travel to the first machine, power the first machine, and return, determining that charging the first machine has priority over performing the second planned paving task.

13. The system control circuitry according to claim 10, further configured to, on condition that the first machine is more critical than the second machine, determine that charging the first machine has priority over performing the second planned paving task.

14. The system control circuitry according to claim 10, further configured to, on condition that charging the first machine has priority, charge the first machine to a predetermined power level.

15. The system control circuitry according to claim 10, wherein the system control circuitry is remote from the worksite.

16. The system control circuitry according to claim 10, further configured to synchronize motion of the first and second machines during charging of the first machine.

17. A method of controlling machines at a worksite, the method comprising:

operating the first and second machines at the worksite based at least in part on a first total amount of power for a first machine to complete a first planned task and a second total amount of power for a second machine to complete a second planned task, respectively, determining a first remaining amount of power in a first energy accumulator of the first machine and a second remaining amount of power in a second energy accumulator of the second machine, and on condition that the first remaining amount of power is less the first total amount of power for the first machine to complete the first planned task and charging of the first machine takes priority over the second machine performing of the second planned task, send the second machine to the first machine and charge the first energy accumulator to at least the first total amount of power for the first machine to complete the first planned task while the first machine continues to perform the first planned task without interruption; and synchronizing motion of the first and second machines during charging of the first machine, wherein the second energy accumulator charges the first energy accumulator via a wire, wherein the second energy accumulator charges the first energy accumulator while the first machine and the second machine are moving, and wherein the first and second planned tasks each include physical manipulation of ground or road material at the worksite according to respective worksite functions of the first and second machines.

\* \* \* \* \*